(12) United States Patent
McMahon et al.

(10) Patent No.: US 11,577,567 B2
(45) Date of Patent: Feb. 14, 2023

(54) GUIDE WHEEL OVERLOAD INDICATORS

(71) Applicant: AUTO TRUCK GROUP, LLC, Bartlett, IL (US)

(72) Inventors: Patrick William McMahon, Streamwood, IL (US); Theodore Joseph Rizo, Orlando Park, IL (US)

(73) Assignee: AUTO TRUCK GROUP, LLC, Bartlett, IL (US)

( * ) Notice: Subject to any disclaimer, the term of this patent is extended or adjusted under 35 U.S.C. 154(b) by 968 days.

(21) Appl. No.: 16/390,657

(22) Filed: Apr. 22, 2019

(65) Prior Publication Data

US 2019/0329615 A1 Oct. 31, 2019

Related U.S. Application Data

(60) Provisional application No. 62/662,247, filed on Apr. 25, 2018.

(51) Int. Cl.
| | |
|---|---|
| *B60F 1/04* | (2006.01) |
| *G01G 19/02* | (2006.01) |
| *G01G 19/12* | (2006.01) |
| *B60W 40/13* | (2012.01) |

(52) U.S. Cl.
CPC ............... *B60F 1/04* (2013.01); *B60W 40/13* (2013.01); *G01G 19/021* (2013.01); *G01G 19/12* (2013.01); *B60F 2301/04* (2013.01); *B60W 2530/10* (2013.01)

(58) Field of Classification Search
CPC ........ B60F 1/04; B60F 1/043; B60F 2301/04; B60W 2530/10; B60W 40/13; G01G 19/021; G01G 19/04; G01G 19/08; G01G 19/12; G01G 23/20
See application file for complete search history.

(56) References Cited

U.S. PATENT DOCUMENTS

| | | | | |
|---|---|---|---|---|
| 3,653,332 | A * | 4/1972 | Olson, Sr. ............... | B60F 1/005 105/72.2 |
| 5,586,507 | A * | 12/1996 | Madison ................. | B60F 1/005 105/215.2 |
| 10,173,875 | B2 * | 1/2019 | Claypool .............. | B66F 17/006 |
| 2017/0151847 | A1 * | 6/2017 | Letukas ................... | B60F 1/04 |

* cited by examiner

*Primary Examiner* — Tyler J Lee

(74) *Attorney, Agent, or Firm* — Richard P. Gilly, Esquire; Archer & Greiner, P.C.

(57) ABSTRACT

A novel system for providing for safe operation of railgear, that is, a set of guide wheels that allow road vehicles to travel on railroad tracks, based on the use of overload indicators installed on the suspension arm of each guide wheel to give operators a quick, visual representation of whether or not a guide wheel is overloaded.

14 Claims, 11 Drawing Sheets

GUIDE WHEEL OVERLOAD INDICATORS

CROSS REFERENCE TO RELATED APPLICATION

This application claims priority from U.S. Provisional Application No. 62/662,247 filed on Apr. 25, 2018.

FIELD OF THE INVENTION

Railgear is the name for a group of devices that allow road vehicles to travel on railroad tracks and defines the field of the instant invention, a novel system providing for safe operation of railgear.

BACKGROUND OF THE INVENTION

Railgear are retractable railroad track compatible guide wheels attached to the body of a road vehicle having rubber automobile or truck tires that can be lowered into place so that the vehicle can travel safely on railroad tracks and not fall off the tracks. Railgear have a maximum load rating for safe operation to prevent derailment, failure and excessive wear. Their maximum load rating is typically limited by the railgear's suspension bodies and guide wheels. These suspensions bodies can be equipped with overload indicators as shown by this disclosure of the present invention in order to reveal individually when each wheel exceeds its maximum rating due to a vehicle's payload.

SUMMARY OF THE INVENTION

Purpose of Guide Wheel Overload Indicators

A manufacturer sets the maximum recommended load for each guide wheel. Any greater load can lead to increased safety exposures and maintenance costs, up to and including critical failure of the railgear. Overload indicators are installed on the suspension arm of each guide wheel and give operators a quick, visual representation of whether or not a guide wheel is overloaded.

Directions for Use

Overload indicators should be checked each time railgear is deployed. Start by fully lowering both the front and rear railgear. Then, for each indicator, take a reading by standing next to the guide wheel, perpendicular to the rail. The line on top of the indicator will point to green or red.

If any wheel has a red reading, it is outside of the manufacturers recommended weight limit for safe operation and should not be used until the problem is corrected. Weight needs to be redistributed or removed from the vehicle until all overload indicators show a green reading. If this is not possible, the weights on one or more guide wheels need to be reset or the railgear may need repairs.

Maintenance

Overload indicators do not require any day to day maintenance. They should be recalibrated as part of an annual FRA inspection. If they are damaged, they will need to be recalibrated or reinstalled.

DETAILED DESCRIPTION OF THE INVENTION

Figure 1:
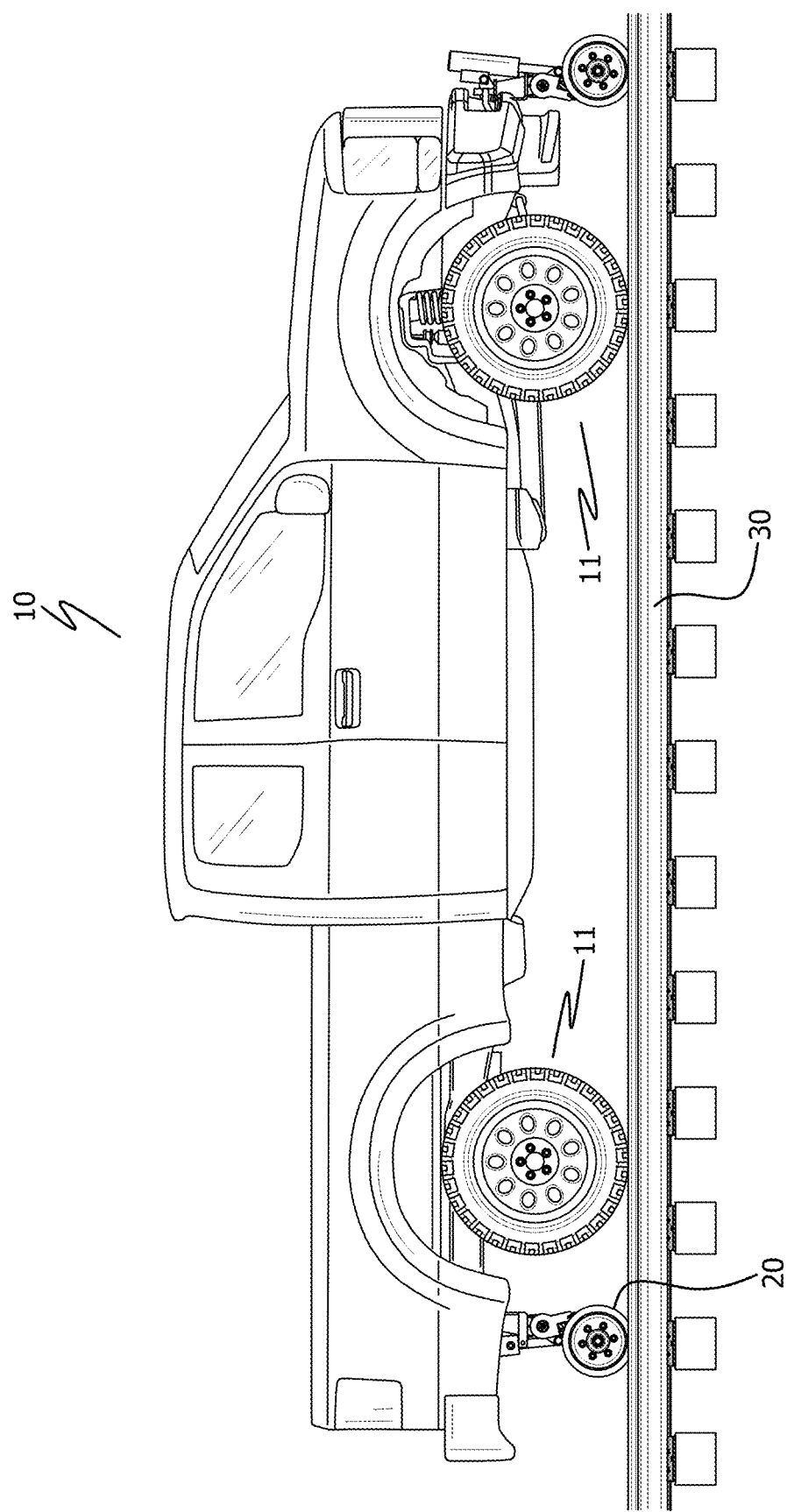
FIG. 1 is a side view of a road vehicle positioned to travel on railroad tracks using railgear.
Figure 2:
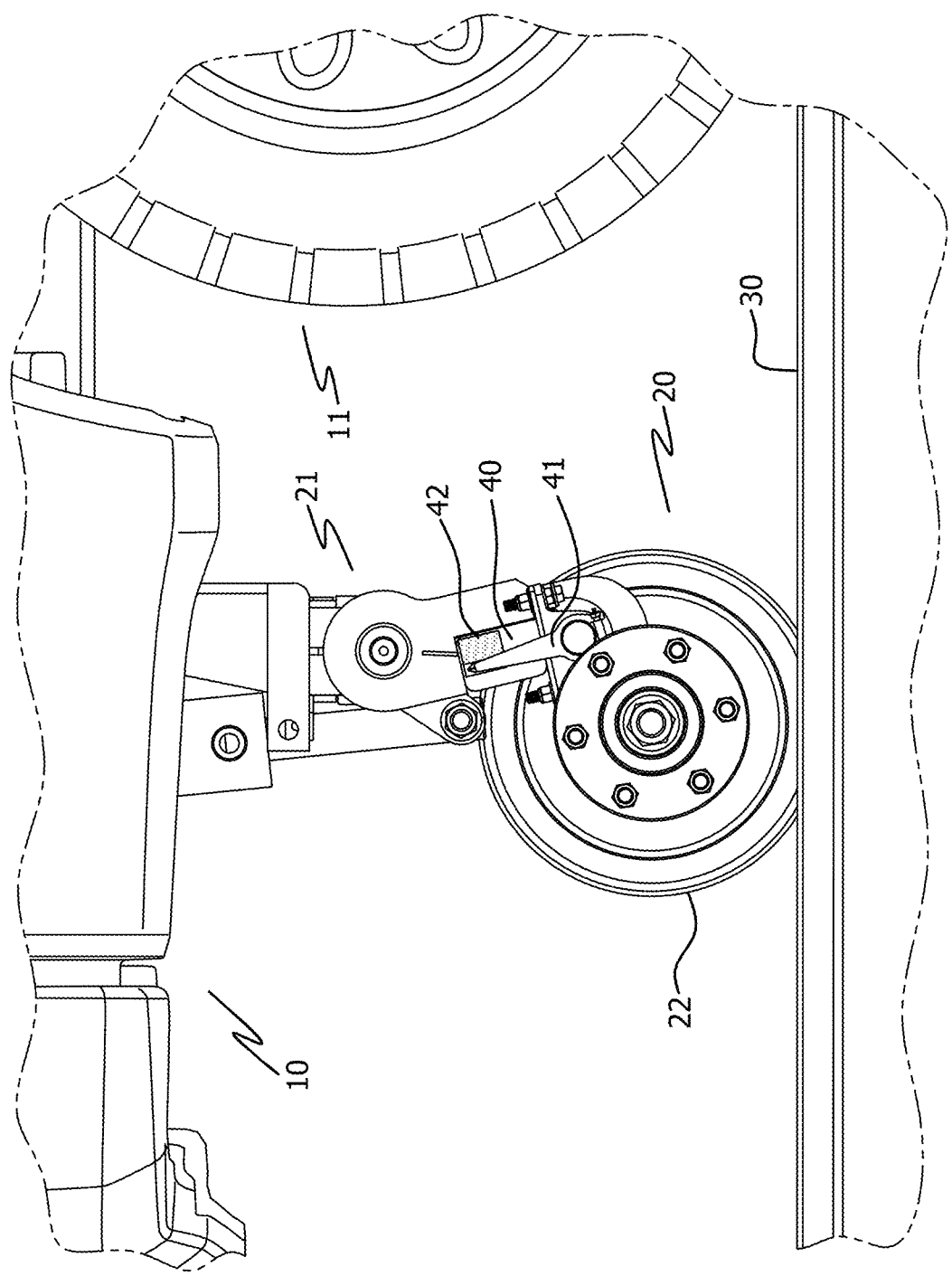
FIG. 2 is a perspective side view of railgear of the present invention from outside of the vehicle.
Figure 3:
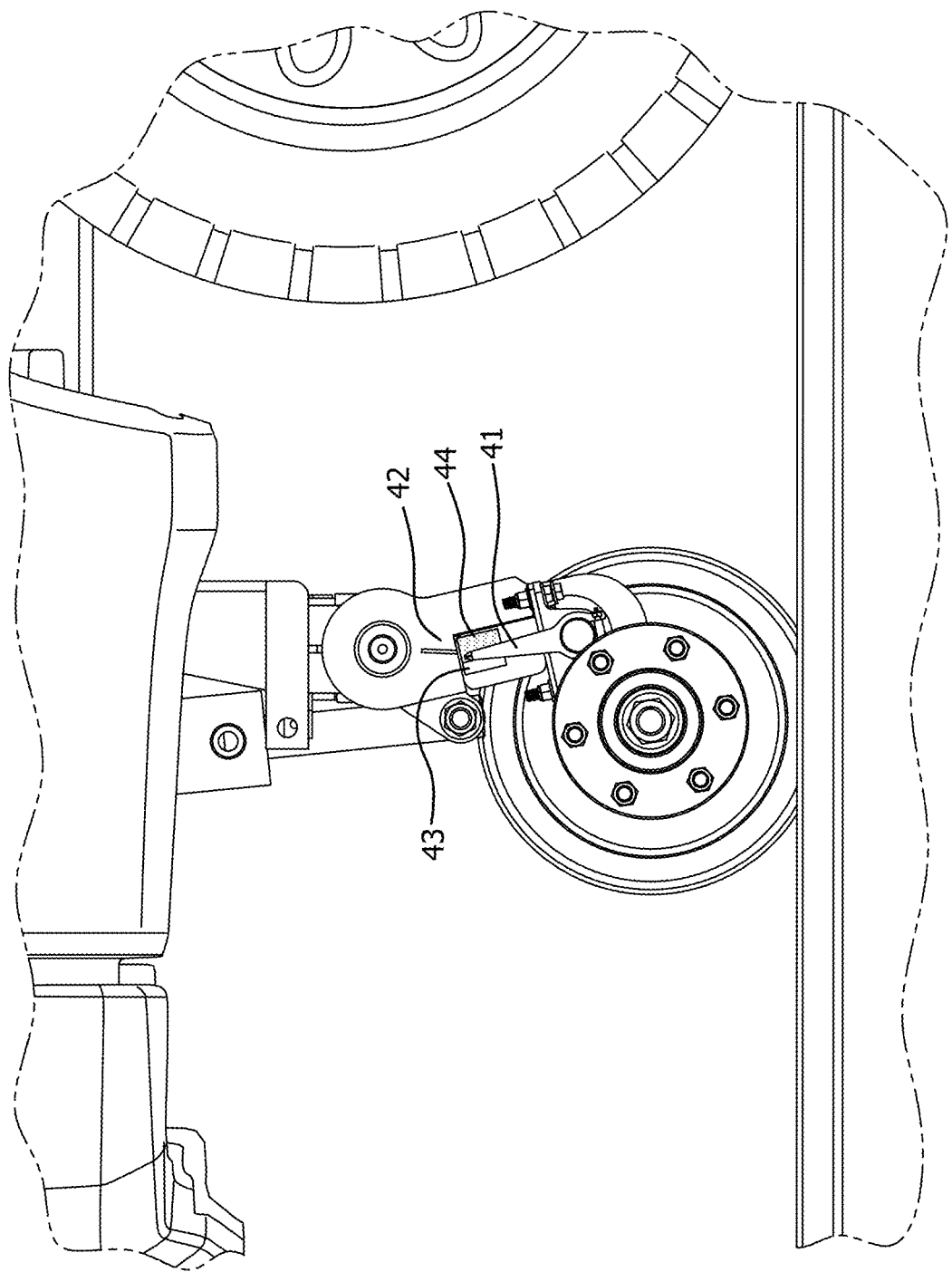
FIG. 3 is a perspective side view of railgear of the present invention showing an increase in load on its guide wheel as compared with FIG. 2.
Figure 4:
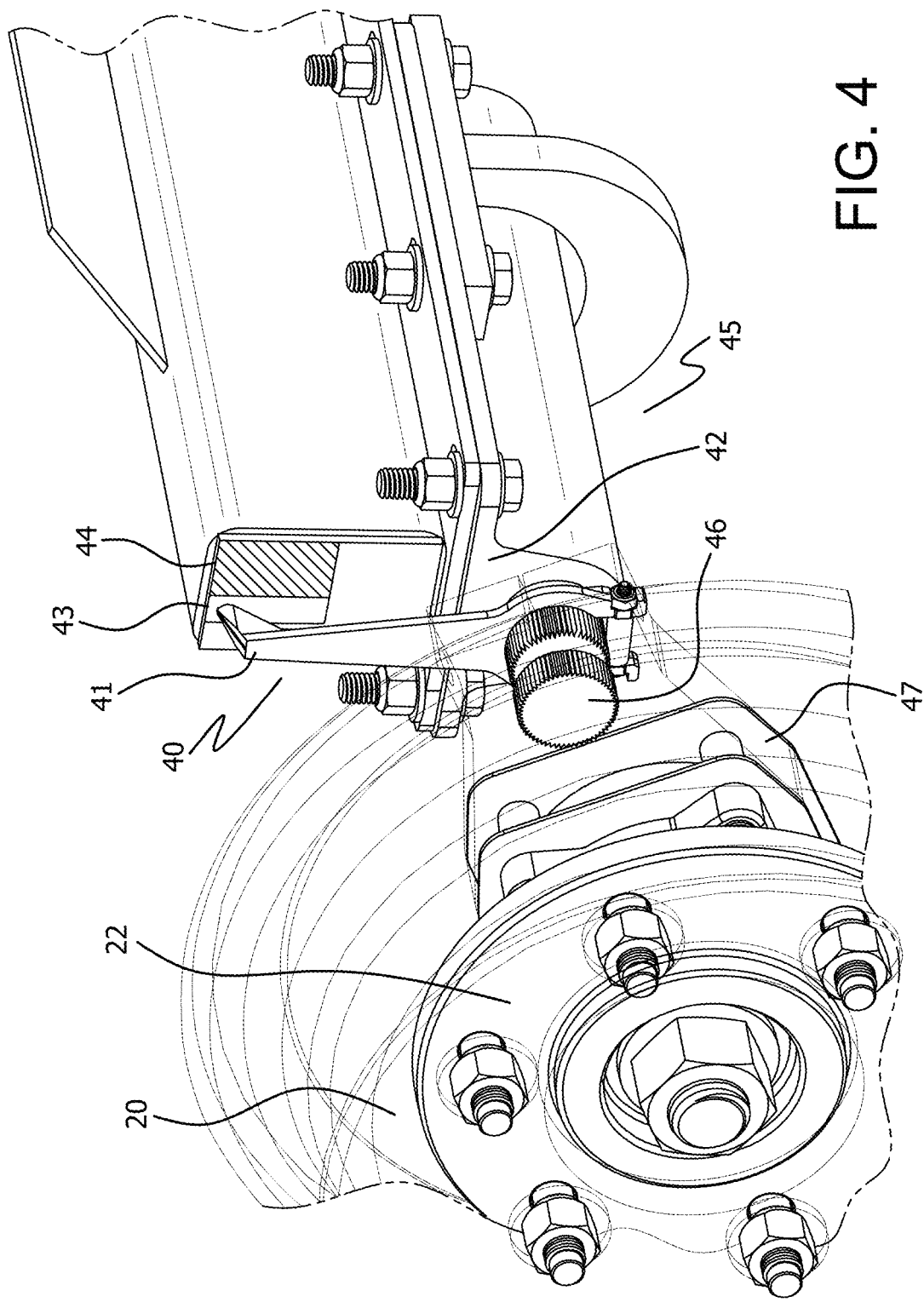
FIG. 4 is a close up perspective view from outside of the vehicle at an angle of the railgear of the present invention.

FIG. 1 shows a road vehicle 10 having rubber tires 11. Railgear 20 has been lowered to guide vehicle 10 as it travels on railroad track 30. In FIG. 2, a close up perspective view of railgear 20 shows retractable structure 21 that connects guide wheel 22 to vehicle 10. FIG. 2 shows overload indicator 40 comprised of indicator arrow 41 viewed in front of indicator meter 42. In FIG. 3 arrow 41 has moved further to the right side of meter 42, moving from the left side 43 thereof (colored green in the preferred embodiment) to the right side 44 (colored red in the preferred embodiment), which movement shows the operator of the vehicle that the load on the guide wheel has increased, which load may soon overload the maximum load capacity of guide wheel 22 and structure 21. FIG. 4 is a blowup from a different perspective of the preferred embodiment in which the arrow 41 remains in the safe (green) zone 43. FIGS. 5, 6, 7, 8 and 9A through 9D show perspective views of arrow 41.

Figure 4A:
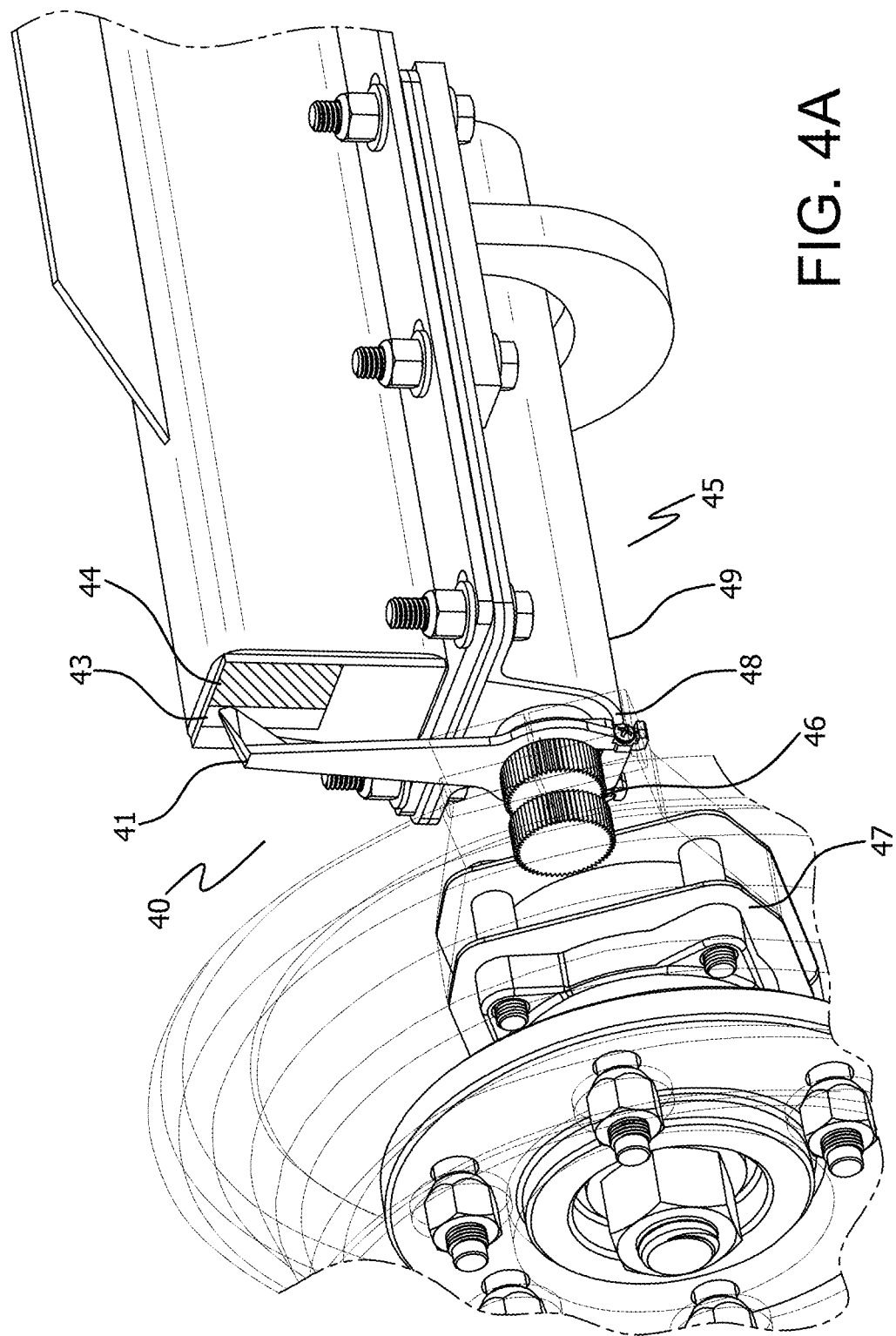
FIG. 4A is a close up perspective view of the railgear of the present invention at an angle slightly different from that of FIG. 4.
Figure 4B:
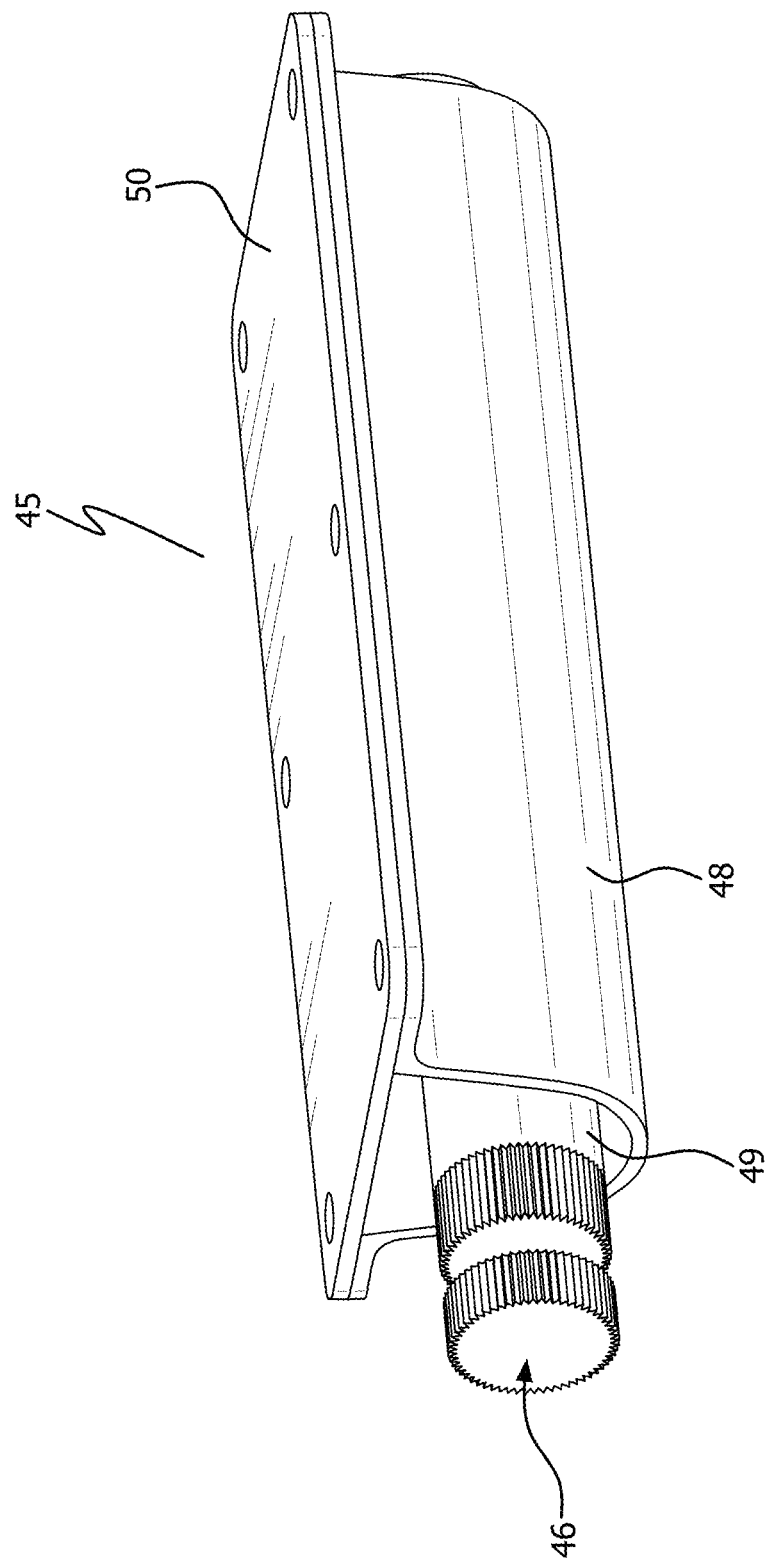
FIG. 4B is a close up perspective view of the suspension body of the railgear of the present invention.
Figure 4C:
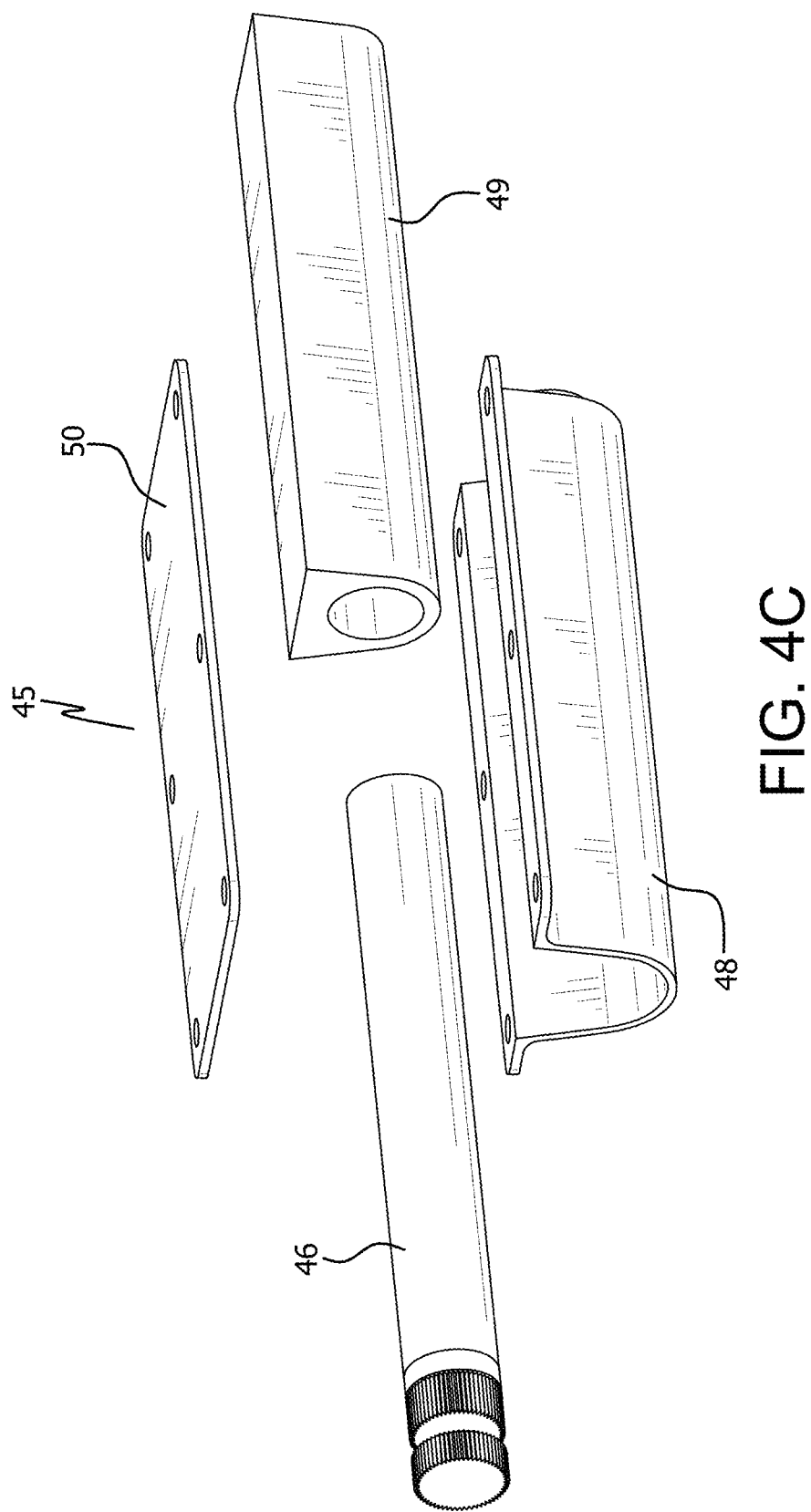
FIG. 4C is an exploded view of the suspension body of FIG. 4B.
Figure 5:
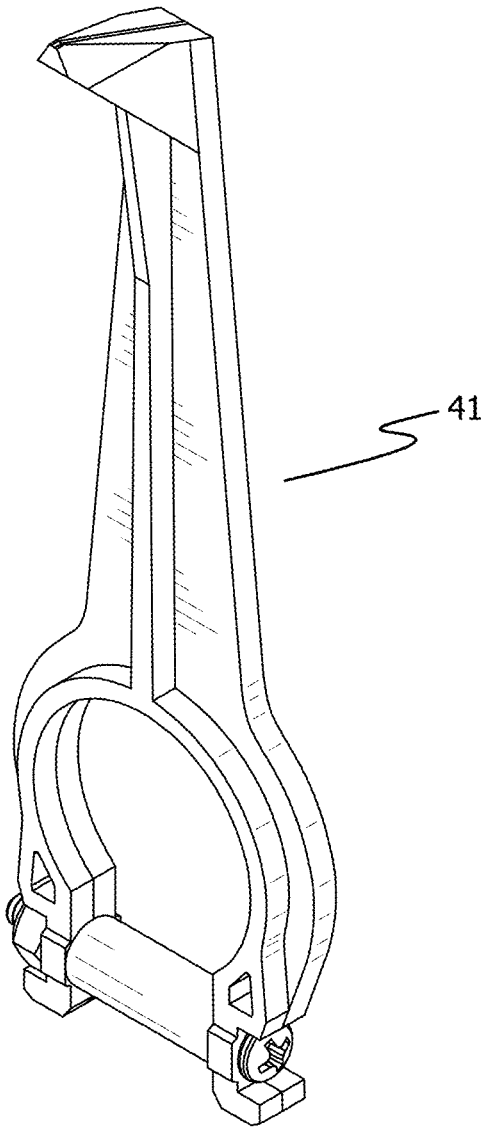
FIGS. 5, 6, 7, 8, and 9A through 9D are perspective views of the indicator arrow of the railgear of the present invention.
Figure 6:
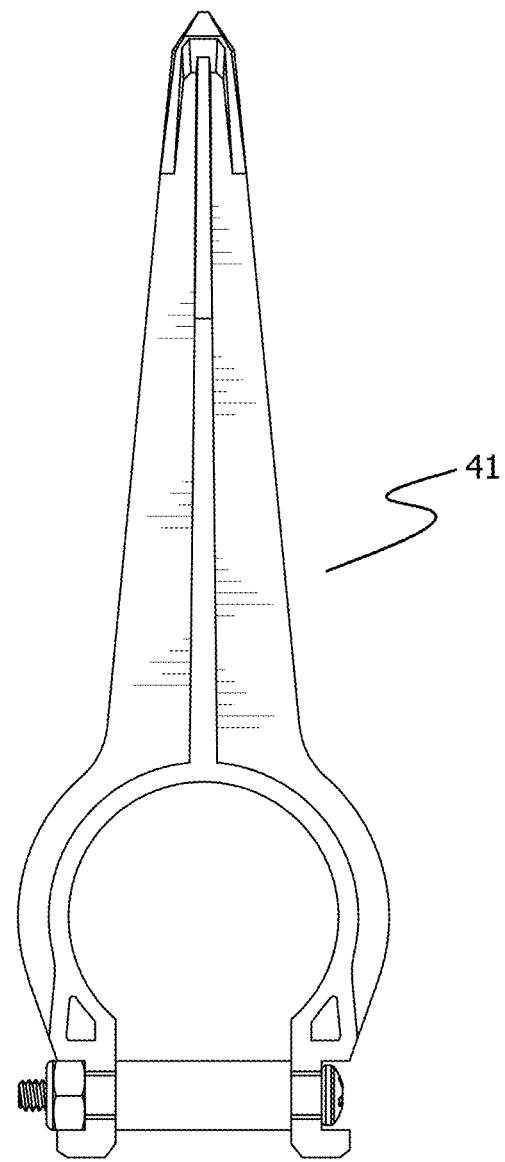
Figure 7:
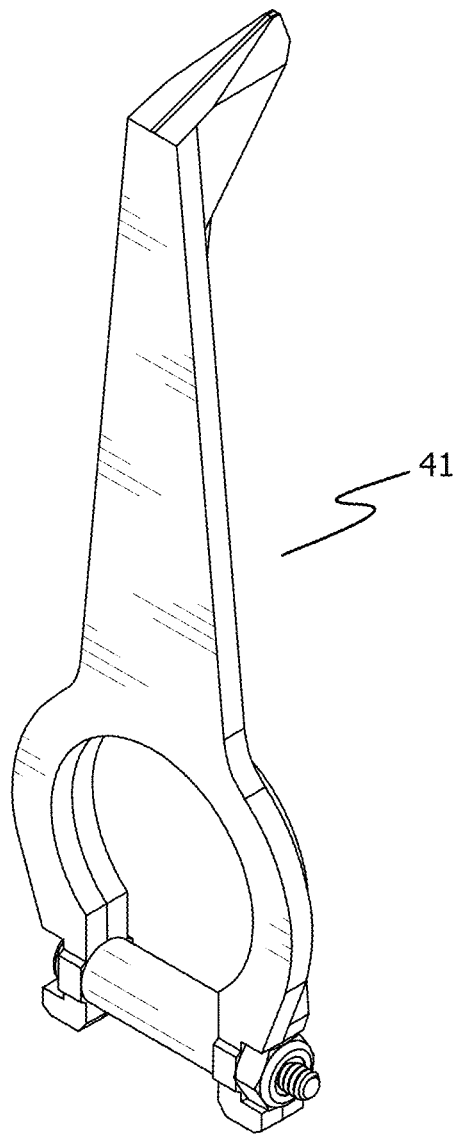
Figure 8:
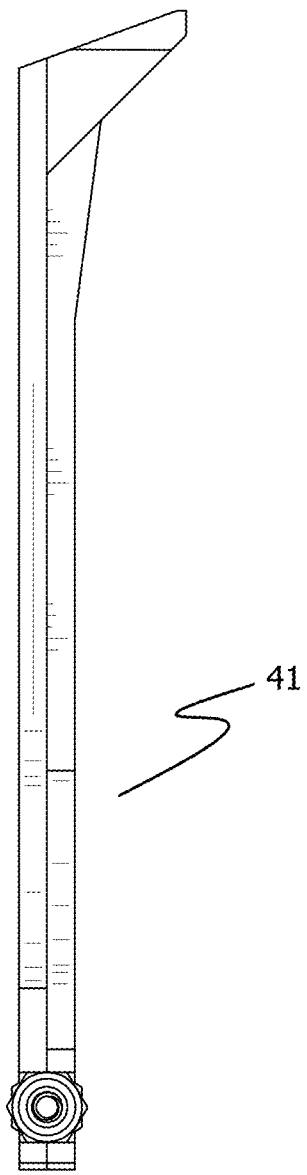
Figure 9C:
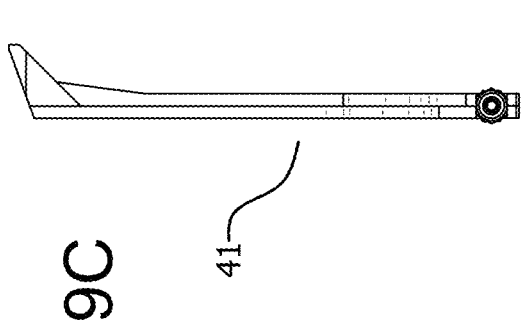
Figure 9D:
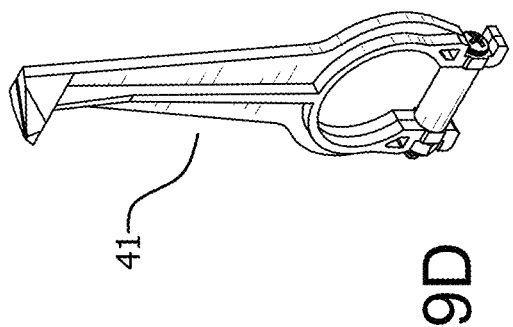
Figure 9A:
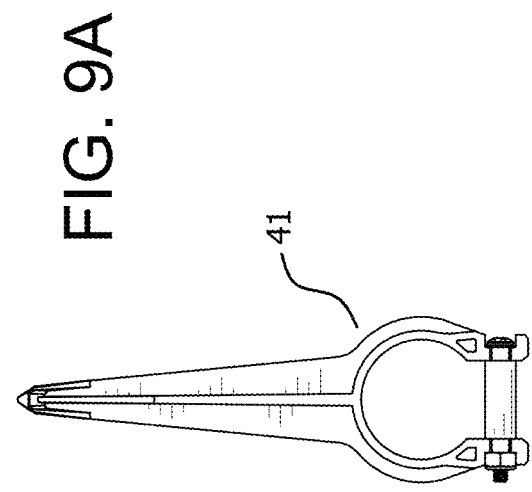
Figure 9B:
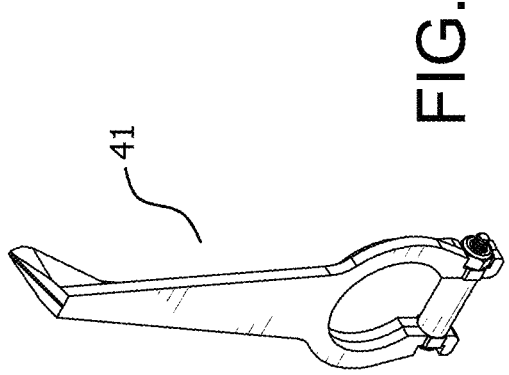
Figure 10:
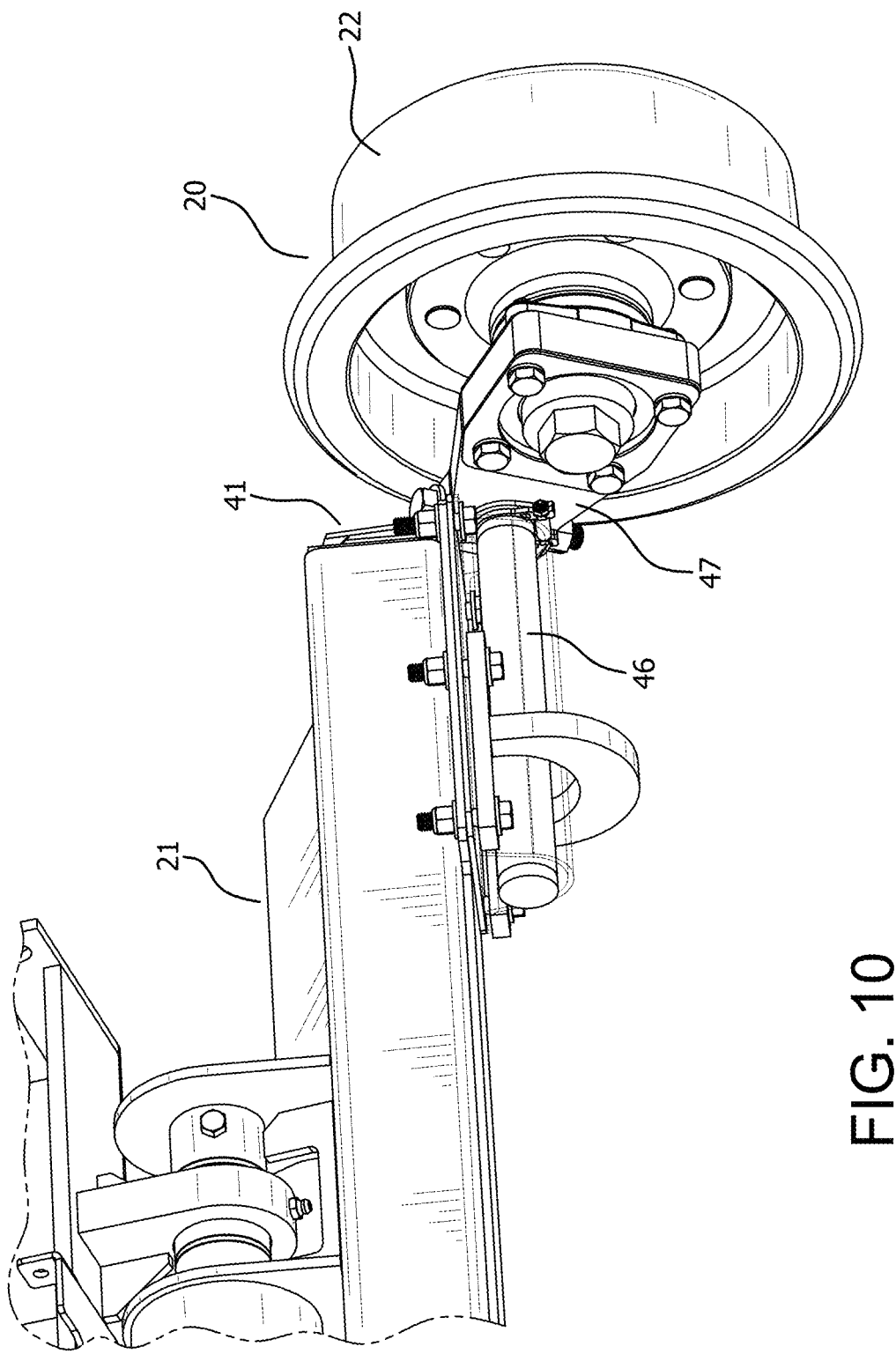
FIG. 10 is a close up perspective view at an angle of the railgear from underneath the vehicle of the present invention.

As shown in FIG. 4, arrow 41 is connected to the splined shaft 46 centered within suspension body 45. As shown in FIG. 10, guide wheel 22 is connected to splined shaft 46 by the wheel arm 47. FIG. 10, being the opposite perspective view of FIG. 4, that is, from the point of view from the center (or underbody) of vehicle 10 outward, better depicts wheel arm 47 connected to splined shaft 46 and guide wheel 22, as suspension body 45 is hidden from that view. Returning to the viewpoint from the side of vehicle 10, FIG. 4A highlights the parts of suspension body 45, that is bottom portion of metal encasement 48 and rubber bond segment 49, as also shown in FIG. 4B with top portion of metal encasement 50 shown as well. Suspension body 45 is shown in exploded view in FIG. 4C with spline shaft 46 removed from the encasement parts 48, 49, and 50.

Overload indicator 40 translates the angular deflection of splined shaft 46 into visual representation of the load on guide wheel 22. Suspension body 45 is metal encased rubber bonded to splined shaft 46 as shown in FIG. 4B. This creates a non-linear torsion spring where the torsional elastic modulus and angular deflection are used to calculate the applied load. Overload indicator 40 works with any torsion spring, linear or non-linear, comprised of any material. The depicted embodiment uses a go/no-go visual indicator meter 42. An alternative embodiment (not shown) can use a display scale with markings, like a beam torque wrench, to indicate the numerical guide wheel load. On indicator meter 42, the green left side 43 and red right side 44 are dependent on which overload indicator/guide wheel is inspected. The red/overloaded zone 42 is always towards the center of vehicle 10.

What is claimed is:

1. A system for safe operation by the driver of a road vehicle for travel on railroad tracks comprising:
    four guide wheels attached to said vehicle;
    overload indicators attached to said vehicle and comprised of an indicator moveably positioned in front of an overload meter face subdivided into a safe operation section and an overload section,
    whereby the position of any one of said indicators with respect to the subdivision of its corresponding meter face indicates whether said corresponding one of said guide wheels is overloaded.

2. The system of claim 1 in which said indicator is arrow-shaped.

3. The system of claim 1 in which one or more of said meter faces are marked with analog scales to indicate the level of load said corresponding guide wheel.

4. The system of claim 3 in which said indicator is arrow-shaped, the point of said arrow indicating the level of load on said corresponding guide wheel analog scale.

5. The system of claim 1 in which said safe operation section is colored green and said overload section is colored red.

6. The system of claim 1 in which said overload section is closer to the center of said vehicle than said safe operation section.

7. The system of claim 1 further comprising: two suspension bodies connected to said body of said vehicle;
    each one of four wheel arms connected to one of said suspension bodies;
    each one of four splined shafts connected to one of said wheel arms and to the corresponding one of said suspension bodies,
    whereby each one of said guide wheels is connected to one of said spline shafts and the corresponding one of said wheel arms such that said indicator of said overload indicator corresponding to said guide wheel is connected to the corresponding one of said splined shafts.

8. The system of claim 7 in which each of said splined shafts is connected to each corresponding one of said suspension bodies by an encasement comprised of:
    a top portion of said encasement;
    a bottom portion of said encasement;
    and a rubber bond segment,
    whereby each of said splined shafts is encased with one of said rubber bond segments enclosed between one of said bottom portions and the corresponding one of said top portions which is connected to the corresponding one of said suspension bodies.

9. In a road vehicle equipped with railgear for travel on railroad tracks, the improvement comprising:
    four guide wheels attached to said vehicle;
    one or more overload indicators attached to said vehicle, each having an overload meter face subdivided into safe operation section and an overload section and an indicator moveably positioned in front of its corresponding meter face,
    whereby the position of any one of said indicators with respect to the subdivision of its corresponding meter face indicates whether the corresponding one of said guide wheels is overloaded.

10. The improvement of claim 9 in which said indicators are arrow-shaped.

11. The improvement of claim 9 in which one or more of said meter faces are marked with analog scales to indicate the level of load said corresponding guide wheel.

12. The improvement of claim 11 in which said indicators are arrow-shaped, the point of said arrow indicating the level of load on said corresponding guide wheel analog scale.

13. The improvement of claim 9 in which said safe operation sections are colored green and said overload sections are colored red.

14. The improvement of claim 9 in which said overload sections are closer to the center of said vehicle than said corresponding safe operation sections.

\* \* \* \* \*